United States Patent
Cook, Jr. et al.

(10) Patent No.: US 6,555,933 B2
(45) Date of Patent: Apr. 29, 2003

(54) AC FIRING CIRCUIT FOR AIR BAG SYSTEMS

(75) Inventors: Charles R. Cook, Jr., Rochester Hills, MI (US); Horst Belau, Clarkston, MI (US); Mark Andrew Parsons, Colorado Springs, CO (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 18 days.

(21) Appl. No.: 09/777,721

(22) Filed: Feb. 6, 2001

(65) Prior Publication Data

US 2001/0022471 A1 Sep. 20, 2001

Related U.S. Application Data

(63) Continuation-in-part of application No. 09/257,122, filed on Feb. 25, 1999, now abandoned.

(51) Int. Cl.[7] .............................................. B60R 21/01
(52) U.S. Cl. ..................... 307/10.1; 307/121; 280/735
(58) Field of Search ................................. 307/9.1, 10.1, 307/121; 280/735; 701/45–47

(56) References Cited

U.S. PATENT DOCUMENTS

| | | |
|---|---|---|
| 5,146,104 A | 9/1992 | Schumacher et al. |
| 5,666,065 A | 9/1997 | Ravas et al. |
| 5,701,038 A | 12/1997 | Kincaid |
| 5,796,177 A | 8/1998 | Werbelow et al. |
| 6,043,566 A | 3/2000 | Bryant et al. |
| 2001/0022471 A1 * | 9/2001 | Cook, Jr. et al. .......... 307/10.1 |

* cited by examiner

*Primary Examiner*—Fritz Fleming

(57) ABSTRACT

A system for controlling air bag deployment in vehicles includes the capability of accommodating varying inductants values in the air bag circuit. Wire harnesses that couple air bag components have varying characteristics, such as length, which affect the inductants value of the circuit. The inventive arrangement utilizes charge and discharge times of at least one capacitor for measuring the inductants of a particular circuit. The system includes a controller that accommodates the inductants by introducing an appropriate delay in the firing circuit signal to operate the air bag.

12 Claims, 3 Drawing Sheets

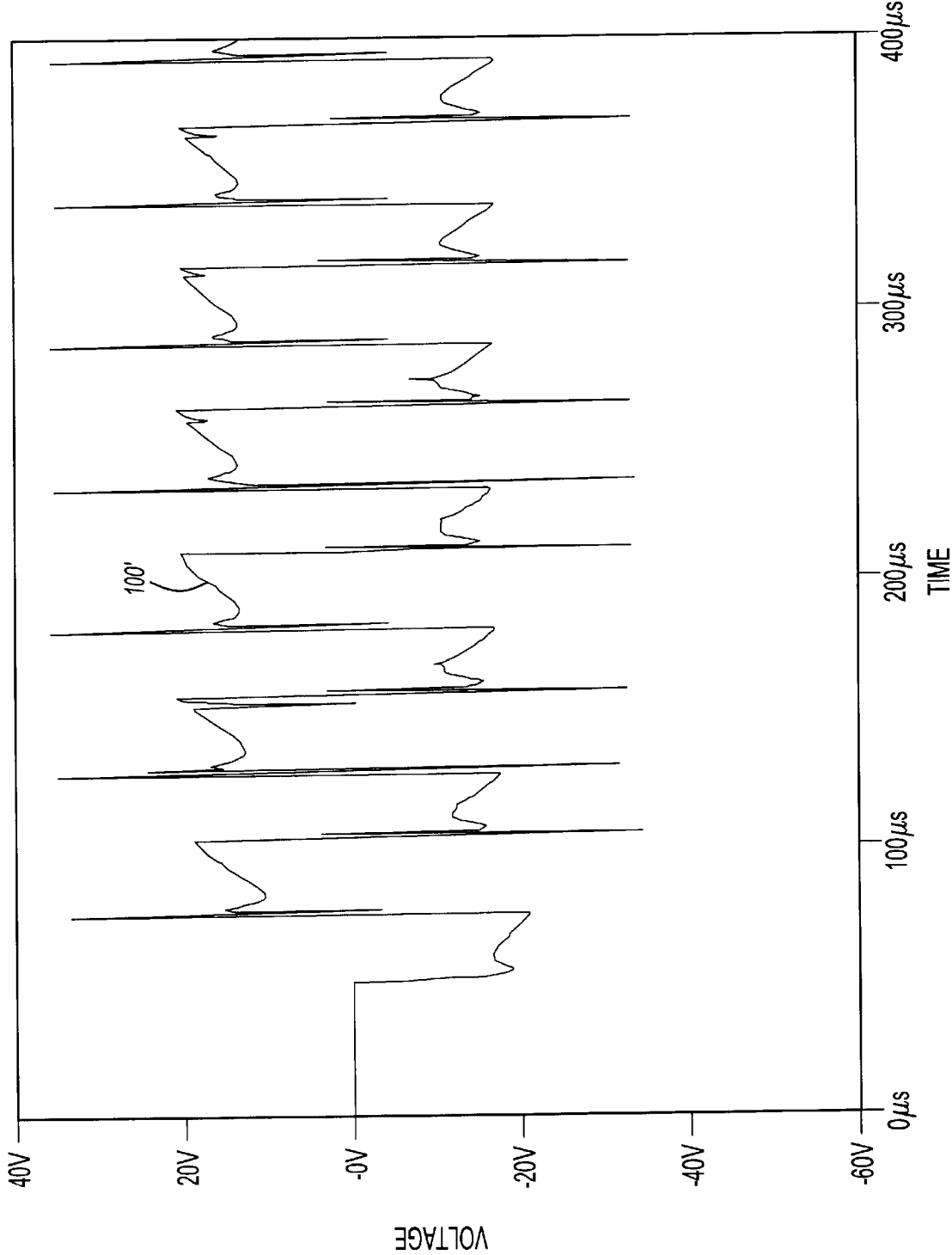

AC FIRING CIRCUIT FOR AIR BAG SYSTEMS

CROSS-REFERENCE TO RELATED APPLICATIONS

This is a continuation-in-part of application No. 09/257,122, filed Feb. 25, 1999, now abandoned.

FIELD OF THE INVENTION

This invention relates to air bag systems for use in automotive vehicles and more particularly to an AC firing circuit for triggering various types of air bag systems.

BACKGROUND OF THE INVENTION

It is known in the art relating to vehicle air bag systems to provide a system that includes a firing circuit that applies energy to a firing element, or squib, to cause inflation of an air bag. The firing circuit is controlled by a deployment command signal which is sent by a microprocessor when the microprocessor has determined that a crash situation exists requiring deployment of the air bag.

A DC or AC firing circuit may be used to trigger the firing element. One example of an AC firing circuit includes a capacitor coupled in series with the firing element. The capacitor has a relatively small capacitance value such that a direct voltage applied to the firing element would be insufficient to fire the firing element. Only after a series of AC current pulses will sufficient energy be transferred to the firing element to cause deployment of the air bag.

One disadvantage of such an AC firing circuit is that it requires a tuned frequency to supply maximum energy to the firing element. Variations in the value of inductance result in different levels of energy being transferred to the firing element. Wiring harnesses connecting various air bags within the vehicle to a firing circuit have different values of inductance depending on the harness length and its routing. Also, whether the air bag requires a clockspring will affect the value of inductance. Thus, it is desirable to have a firing circuit that supplies maximum energy to the firing element over a wide range of inductance.

SUMMARY OF THE INVENTION

The present invention provides a method and universal firing system for providing sufficient energy to trigger a firing element causing deployment of various types of air bags within a vehicle.

An object of the present invention is to provide an AC firing circuit for supplying maximum energy to trigger a firing element to cause deployment of various types of air bags over a wide range of inductance.

Another object of the present invention is to provide the ability to trigger the firing element even if there is a short to ground or the power supply within the firing circuit.

The universal firing system of the present invention includes an acceleration sensor for producing an output signal indicative of the vehicle's acceleration. From the output signal of the acceleration sensor, an air bag controller determines whether a crash condition exists requiring deployment of an air bag. If deployment of the air bag is necessary, the controller sends a firing command signal to a power switching circuit which supplies charge and discharge current pulses of alternating polarity to a firing loop having a firing element in series with an unknown inductance and a capacitor. In order to provide maximum current to the firing element, a delay circuit is connected to the power switching circuit to control and adjust the frequency of the charge and discharge current pulses applied by the power switching circuit to the resonant frequency of the firing loop.

The delay circuit detects a charge or discharge period of the capacitor and delays the charge or discharge current pulse of the series for a delay period proportional to the detected charge or discharge period. Then, the delay circuit drives the power switching circuit to apply a next current pulse of the series in an opposite direction of the present current pulse. After the series of current pulses, a sufficient amount of energy is transferred to the firing element causing a chemical reaction which generates a gas and causes the air bag to inflate.

The method of the present invention includes the steps of receiving a firing command signal from an air bag controller indicative of the existence of a crash condition requiring deployment of an air bag. In response to the fifing command signal, a power switching circuit applies a series of charge and discharge current pulses of alternating polarity to a firing loop having a firing element coupled in series with unknown inductance and a capacitor. During the application of the current pulses, the charging and discharging of the capacitor to a predetermined low voltage level is detected and measured. This measured charge or discharge period, which provides an indication of inductance, is used to calculate a delay period for delaying the start of the next current pulse in the series to adjust the frequency of the current pulses to the resonant frequency of the firing loop. Thus, by maintaining the current at resonant frequency, maximum current is provided to the firing element.

These and other features and advantages of the invention will be more fully understood from the following detailed description of the invention taken together with the accompanying drawings.

BRIEF DESCRIPTION OF THE DRAWINGS

The accompanying drawings, which are incorporated herein and constitute part of this specification, illustrate presently preferred embodiments of the invention, and, together with a general description given above and the detailed description of the preferred embodiments given below, serve to explain the principles of the invention.

FIG. 3 is a graph of a voltage across a firing loop vs. time where the firing loop has an inductance equal to 14 $\mu$H.

DETAILED DESCRIPTION OF THE INVENTION

Figure 1:
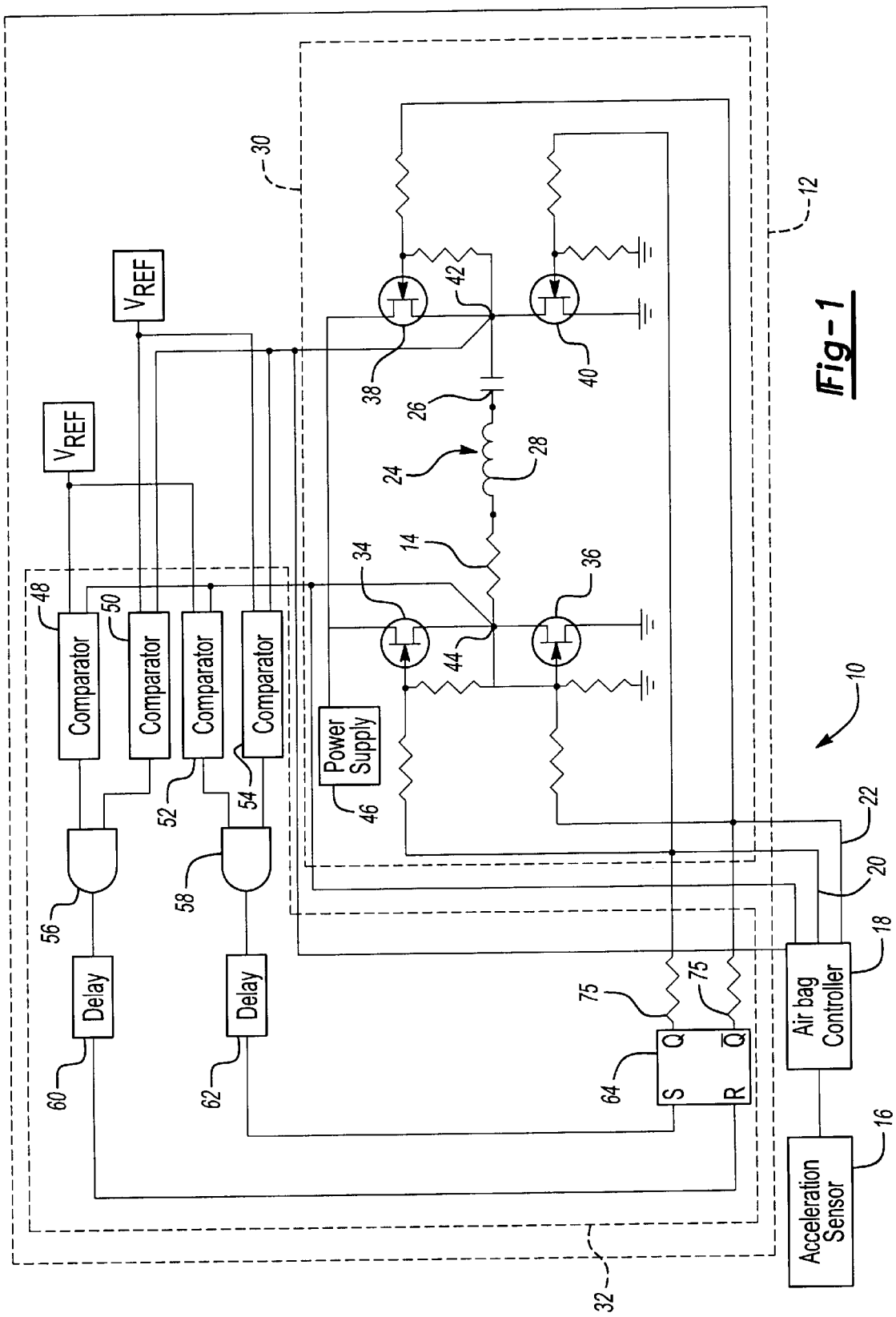
FIG. 1 is a schematic diagram of a universal firing system for various types of air bag systems in accordance with the present invention.

Referring first to FIG. 1 of the drawings in detail, numeral 10 generally indicates a universal firing system for triggering various types of air bag systems. The firing system 10 includes a firing circuit 12 which triggers a firing element 14, or a squib, to cause inflation of an air bag (not shown). To determine if the air bag needs to be deployed, an acceleration sensor 16 monitors the vehicle acceleration and produces an output signal indicative of the acceleration. An air bag controller 18 coupled with the sensor 16 analyzes the output signal from the sensor 16 and determines whether a crash condition is present requiring deployment of the air bag. If a crash condition exists, the controller 18 sends a firing command signal via signal lines 20 and 22 to the firing circuit 12. The signal lines 20 and 22 preferably represent input to and output from the controller 18.

The airbag controller 18 preferably is a programmable microprocessor. Given this description, those skilled in the art will be able to develop the specific software code necessary for achieving the results provided by this invention using commercially available microprocessors or custom design circuitry, for example. While the controller 18 is shown with certain inputs and outputs, the use of the controller is nonspecifically limited to the schematic lines shown in FIG. 1. Only specific connections have been shown for simplicity.

The firing circuit 12 applies a series of AC charge and discharge current pulses of alternating polarity to a firing loop 24 sufficient to fire the firing element. The firing loop 24 includes the firing element 14, a capacitor 26 and unknown inductance 28 in series. The capacitor 26 preferably has a relatively small capacitance value to prevent a direct current from inadvertently triggering the firing element 14. Thus, only after a cumulative series of current pulses will sufficient energy be transferred to the firing element 14 to ignite and cause inflation of the air bag.

The firing circuit 12 includes a power switching circuit 30 which supplies the charge and discharge current pulses to the firing loop 24 and a delay circuit 32 that controls the power switching circuit 30 and adjusts the frequency of the current pulses to provide maximum current to the firing element 14. The frequency of the current pulses needs to be adjusted because of the unknown inductance 28. The inductance 28 varies from one air bag to another because of a wiring harness (not shown) that connects the firing circuit 12 to the firing element 14 which generally is at a location remote from the air bag controller 18. The wiring harness has an inherent inductance and the value of the inductance depends on the length and route of the harness. Variations in inductance will affect the amount of energy transferred to the firing element 14 ensuring that sufficient energy is transferred to ignite the firing element 14.

The power switching circuit 30 preferably includes four electronic switches 34,36,38,40, such as field effect transistors (FET), connected in an H-Bridge configuration with the firing loop 24 connected between the two pairs of charge and discharge switches 34,36 and 38,40. A first end 42 of the firing loop 24 is connected to one half of the H-Bridge and a second end 44 of the firing loop 24 is connected to the other half of the H-Bridge. The H-Bridge configuration allows current to flow bidirectionally and thus one direction of current flow charges the capacitor 26 and the other direction of current flow discharges the capacitor 26. Also, by using the H-Bridge configuration instead of just a pair of switches, the firing element 14 will still fire even though a short exists from either side of the firing element 14 to ground or to a voltage power supply 46.

The voltage power supply 46 is connected with the power switching circuit 30 in order for the switching circuit 30 to apply current to the firing loop 24. Each half of the bridge includes two switches 34,40 and 36,38. Charge Switches 34,40 act as current sources between the power supply and the switching circuit 30 and supply current to charge the capacitor 26 and the discharge switches 36,38 act as current sinks, which couple a grounded return path to the wiring harness to discharge the capacitor 26. Each pair of switches 34,40 and 38,36 operate in a push-pull arrangement which means that one switch, 34 or 38 conducts during one half of a cycle and the other switch 36 or 40 conducts during the other half of a cycle.

The delay circuit 32 controls the four switches 34,36,38, 40 between conductive and non-conductive states to apply charge and discharge current pulses at maximum current to the firing loop 24. The delay circuit 32 preferably includes comparators 48,50,52,54, AND gates 56,58, delay means 60,62 and a flip-flop 64. The controller 18 also controls delays within the circuitry. Comparators 48,52 are connected to the source of switch 34, the drain of switch 36 and the second end 44 of the firing loop 24. Comparators 50,54 are connected to the source of switch 44, the drain of switch 40 and the first end 42 of the firing loop.

The outputs of the comparators 48,50 are applied to the AND gate 56 to determine when to start discharging the capacitor 26. The outputs of comparators 48,50 are logically HIGH, when a voltage at the first end 42 of the firing loop 24 is greater than a predetermined low voltage level while a voltage at the second end 44 of the firing loop 24 remains above a predetermined high voltage level. When the outputs of comparators 48,50 are logically HIGH, the output of the AND gate 56 is logically HIGH, otherwise the output of the AND gate 56 is logically LOW. When the AND gate 56 is logically HIGH, this indicates that the direction of the current pulse should change to allow the discharging of the capacitor 26.

The outputs of the comparators 52,54 are applied to AND gate 58 to determine when to start charging, the capacitor 26. The outputs of the comparators 52,54 are logically HIGH, when the voltage at the second end 44 of the firing loop 24 is greater than the predetermined low voltage level while the voltage at the first end 42 of the firing loop 24 is above the predetermined high voltage level. The output of AND gate 58 is logically HIGH when comparators 52,54 are logically HIGH, otherwise the output of AND gate 58 is logically LOW. When the AND gate 58 is logically HIGH, this indicates that the direction of the current pulse should change to allow the charging of the capacitor 26.

The first delay means 60 is connected between the output of AND gate 56 and a reset input of the flip-flop 64. A second delay means 62 is connected between the output of AND gate 58 and a set input of the flip-flop 64. The illustration includes delay means 60,62 but the delay may be provided by the air bag controller 18 without separate circuitry. The controller 18 preferably is programmed to operate the circuitry of each embodiment to achieve the desired timing characteristics. In one example, the functions of the illustrated logic components are all in the controller 18.

The controller 18 preferably is programmed to measure a charge or discharge period which equals the time required for the first 42 or second 44 end of the firing loop 24 to be greater than the predetermined low voltage level. Then, the controller adds a delay period that is proportional to the measured charge or discharge period to the output of the AND gate 56 or 58 depending on which AND gate 56 or 58 is logically HIGH. The size of the delay preferably is based upon data stored in memory in the controller 18. Given this description, those skilled in the art will be able to determine the appropriate delay times to accommodate the inductance of a given system to meet the needs of their particular situation.

The delay period adjusts the frequency of the present series of current pulses such that the next current pulse series applied to the firing loop 24 will be at the resonant frequency of the firing loop 24. In this manner, the inductance value is accommodated so that the system 10 is capable of efficiently operating a variety of air bag systems. The outputs of the delay means 60,62 are applied to the flip-flop 64. The flip-flop 64 changes the outputs from the delay means 60,62 to their opposite states. The outputs of the flip-flop 64 are applied to the gates of the switches 34,36,38,40 to drive the switches between conductive and nonconductive states depending on the desired current pulse direction for charging and discharging the capacitor 26.

In operation, the air bag controller 18 sends a firing command signal to initiate firing the firing element 14 via signal lines 20 and 22. Switches 34,40 are in a conductive state and switches 36,38 are in a nonconductive state. The charge current pulse flows from the second end 44 of the firing loop 24 to the first end 42 of the firing loop 24, charging the capacitor 26. The voltage at the second end 44 of the firing loop 24 is pulled high and the voltage at the first end 42 of the firing loop 24 is pulled low. As the current increases through the firing loop 24, the voltage at end 44 will decrease and the voltage at end 42 will increase. When the voltage at end 42 reaches the predetermined low voltage level and the voltage at end 44 remains above the predetermined high voltage level, AND gates 56,58 change states, indicating the desire to change the direction of the current pulse to discharge the capacitor 26. Stated differently, when a voltage across the firing loop reaches a threshold voltage level, the AND gates 56,58 change states.

The delay means 60,62 hold the output signals from the AND gates 56,58 for the delay period to adjust the frequency of the present current pulse to the resonant frequency of the firing loop 24. The output signals of the delay means 60,62 are applied to inputs of the flip-flop 64. The flip-flop 64 changes the out put signals of the delay means 60,62 to their opposite states. The outputs of the flip-flop 64 are applied to the gates of the switches 34,36,38,40.

Now switches 38, 36 are in a conductive state and switches 34, 40 are in a nonconductive state, causing a discharge current pulse to flow in the opposite direction through the firing loop 24 to discharge the capacitor 26. The voltage at the first end 42 is pulled high and the voltage at the second end 44 is pulled low. As the current increases through the firing loop 24, the voltage at end 42 will decrease and the voltage at end 44 will increase. When the voltage at end 44 reaches the predetermined low voltage level and the voltage at end 42 is still above the predetermined high voltage level, AND gates 56,58 change states, indicating a desire to change direction of the current pulse direction to charge the capacitor 26. Stated differently, when the voltage across the firing loop reaches the threshold voltage level, AND gates 56,58 change states.

The delay means 60, 62 hold the output signals from the AND gates 56,58 for the delay period to adjust the frequency of the current pulses to the resonant frequency of the firing loop 24. The output signals of the delay means 60,62 are applied to inputs of the flip-flop 64. The flip-flop 64 changes the output signals of the delay means 60,62 to their opposite status. The outputs of the flip-flop 64 are applied to the gates of the switches 34,36,38,40. Now, switches 34,40 are in a conductive state and switches 36,38 are in a nonconductive state, causing a charge current pulse to flow in the opposite direction through the firing loop 24. The whole cycle begins again and current is continued to be applied to the firing loop 24 until the firing element 14 is ignited, causing the air bag to inflate or the controller 18 interrupts the series of current pulses.

The controller 18 may override the delay of 60 and 62 by providing the necessary delay directly via signal lines 20 and 22 or by controlling the flip-flop output directly. The resistors 75 facilitate permitting the controller 18 to override the flip-flop output.

Figure 2:
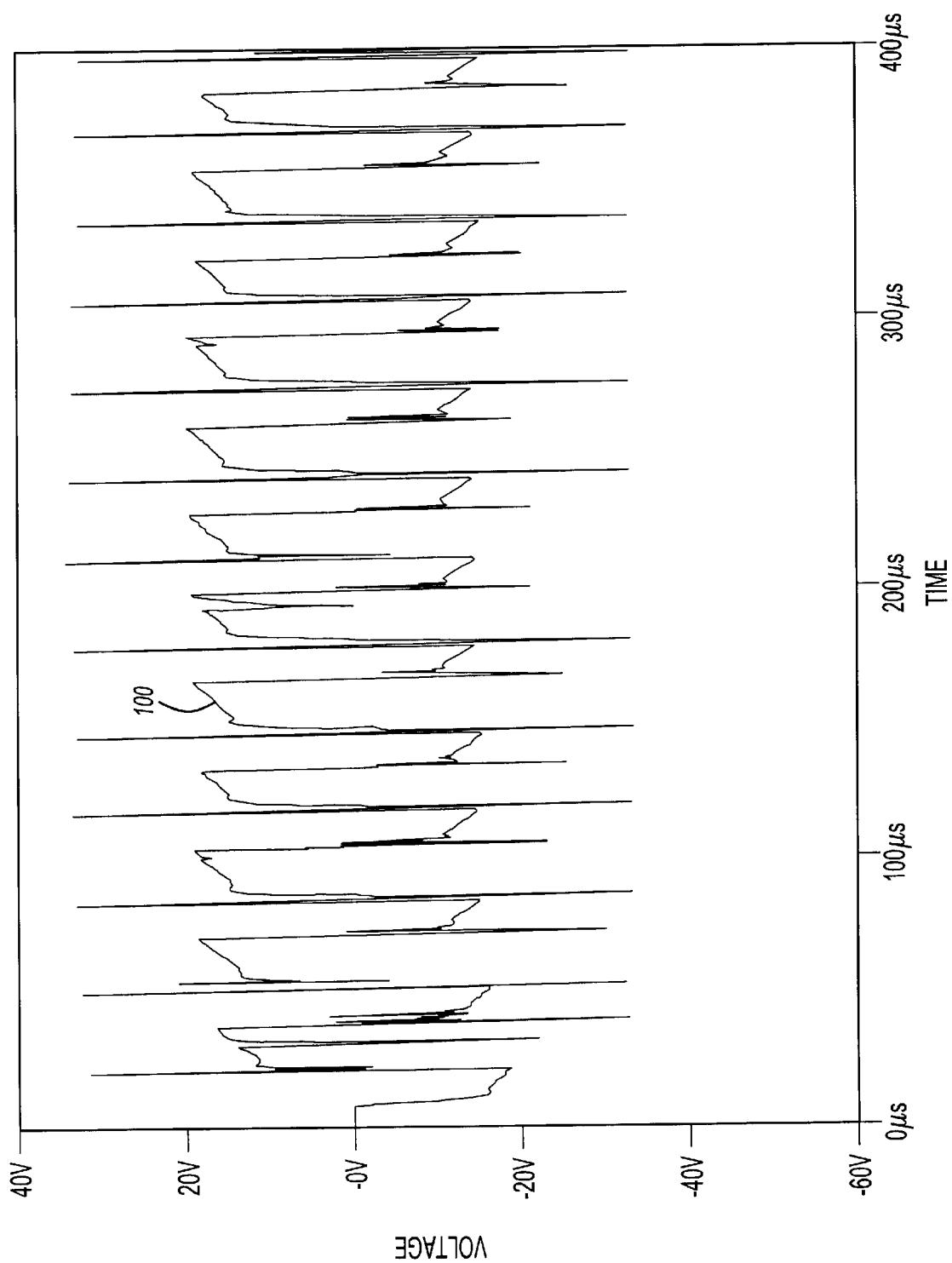
FIG. 2 is a graph of a voltage across a firing loop vs. time where the firing loop has an inductance equal to 4 $\mu$H.

FIG. 2 is a graph of a voltage 100 across a firing loop vs. time where the firing loop has an inductance equal to 4 $\mu$H, illustrating a relatively low inductance in an air bag system. This illustration shows the results of introducing a delay of 25 $\mu$s.

FIG. 3 is a graph of a voltage 100' across a tiring loop vs. time where the firing loop has an inductance equal to 14 $\mu$H, illustrating a relatively high inductance in an air bag system. This example shows the preferred effect of introducing a 45 $\mu$s delay. The longer delay accommodates the resonant frequency of the larger inductance valve FIGS. 2 and 3 show that an AC-firing circuit of the present invention supplies maximum current to the firing loop over a wide range of inductance in the air bag system. Given this description, those skilled in the art will be able to determine the appropriate delay time to address the inductance of a system to meet the needs of their particular situation.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

We claim:

1. A system for controlling airbag deployment, comprising:
   a firing element that activates the airbag;
   a power source that supplies current pulses to the firing element;
   a capacitor coupled in series with the firing element; and
   a controller that controls the supply of current pulses to the firing element, the controller monitoring a charge time and a discharge time of the capacitor and using the charge or discharge time as an indicator of an inductance value associated with the firing element, the controller adjusting the supply of current pulses to accommodate the inductance.

2. The system of claim 1, including a logic circuit associated with the capacitor such that the logic circuit changes state responsive to a change in a charge condition of the capacitor whereby the logic circuit indicates to the controller when the capacitor has fully charged or discharged, respectively.

3. The system of claim 1, wherein the controller adjusts a frequency of the current pulses responsive to the indicated inductance value.

4. The system of claim 3, wherein the controller adjusts the frequency in an amount that is proportional to the charge time or the discharge time of the capacitor.

5. The system of claim 1, including a wire harness coupling the firing element to the power source and wherein the wire harness has the inductance value associated with the firing element.

6. The system of claim 1, wherein the controller introduces a delay between current pulses that is proportional to the determined charge or discharge time.

7. The system of claim 1, wherein the controller uses the discharge time of the capacitor as the indicator of inductance.

8. A method of controlling airbag deployment in a system having an airbag firing element coupled in series with a capacitive element and an inductive circuit portion, comprising the steps of:
   powering the firing element using a series of current pulses;
   determining a time associated with a charging function of the capacitive element; and
   adjusting a frequency of the series of current pulses based upon the determined charge time.

9. The method of claim 8, wherein the charging function time of the capacitive element is one of a time that it takes for the capacitive element to charge up or a time that it takes for the capacitive element to discharge.

10. The method of claim 8, including introducing a delay between current pulses that is proportional to the determined charging function time.

11. The method of claim 8, wherein the charging function time of the capacitive element is the time it takes for the capacitive element to discharge.

12. A system for controlling airbag deployment, comprising:

a firing element that activates the airbag;

a power source that supplies current pulses to the firing element;

a capacitor coupled in series with the firing element; and a controller that controls the supply of current pulses to the firing element, the controller determining a discharge time of the capacitor and using the discharge time as an indicator of an inductance value associated with the firing element, the controller adjusting the supply of current pulses responsive to the discharge time of the capacitor to accommodate the inductance.

* * * * *